United States Patent [19]

Barel

[11] Patent Number: 5,069,376

[45] Date of Patent: Dec. 3, 1991

[54] MOTOR VEHICLE ACCESSORY PARTICULARLY USEFUL FOR HOLDING A SIGN OR OTHER ARTICLE

[76] Inventor: Meir Barel, 24 Hare'ut Street, Hod Hasharon, Israel

[21] Appl. No.: 625,338

[22] Filed: Dec. 11, 1990

[30] Foreign Application Priority Data

Jan. 5, 1990 [IL] Israel .................................. 92976

[51] Int. Cl.$^5$ ............................................... B60R 7/04
[52] U.S. Cl. ........................................ 224/277; 40/643; 40/644; 40/593
[58] Field of Search ............... 296/37.12; 40/593, 644, 40/661, 643; 224/277

[56] References Cited

U.S. PATENT DOCUMENTS

| | | | |
|---|---|---|---|
| 2,690,928 | 10/1954 | Boynes | 40/643 X |
| 3,533,178 | 10/1970 | Strohmaier | 40/593 X |
| 3,564,739 | 2/1971 | Gauche | 40/661 |

FOREIGN PATENT DOCUMENTS

| | | | |
|---|---|---|---|
| 813060 | 5/1959 | United Kingdom | 40/593 |
| 2190894 | 12/1987 | United Kingdom | 40/643 |

*Primary Examiner*—Margaret A. Focarino
*Assistant Examiner*—Gary C. Hoge
*Attorney, Agent, or Firm*—Benjamin J. Barish

[57] ABSTRACT

A motor vehicle accessory particularly useful for holding a sign or other article, includes a plate member formed at one end with a mounting section for insertion between the vehicle windshield and the vehicle dashboard. The mounting section extends obliquely to the plate member, and is joined to it by an elastic juncture section, such that when the mounting section is inserted between the vehicle windshield and the vehicle dashboard, the plate member is pressed towards the inner surface of the windshield to thereby releasably hold a sign or other article between it and the inner surface of the windshield.

19 Claims, 2 Drawing Sheets

MOTOR VEHICLE ACCESSORY PARTICULARLY USEFUL FOR HOLDING A SIGN OR OTHER ARTICLE

FIELD AND BACKGROUND OF THE INVENTION

The present invention relates to a motor vehicle accessory, and particularly to an accessory which may be used for holding a sign or other article against the inner surface of the motor vehicle windshield.

It is frequently necessary or desirable to hold a sign (e.g., an emblem, pass, permit, or other like device) against the inner surface of a motor vehicle and windshield. This is frequently done in a permanent manner, by applying the sign as a sticker adhesively joined to the inner surface of the windshield. However, there are many such applications where it is desired to remove the sign, or to insert other signs, in a convenient manner.

OBJECTS AND BRIEF SUMMARY OF THE INVENTION

An object of the present invention is to provide a motor vehicle accessory particularly useful for holding a sign or other article against the inner surface of a motor vehicle windshield in a manner which permits the article to be conveniently applied or removed as desired.

According to the present invention, there is provided a motor vehicle accessory particularly useful for holding a sign or other article, comprising: a plate member formed at one end with a mounting section for insertion between the vehicle windshield and the vehicle dashboard; the mounting section includes parallel opposed faces extending at an oblique angle to the plate member, and being joined to it by an elastic juncture section, such that when the mounting section is inserted between the vehicle windshield and the vehicle dashboard, the plate member is pressed, by said oblique angle of the mounting section and the elasticity of said juncture section, towards the inner surface of the windshield to thereby contact and releasably press a sign or other article against the inner surface of the windshield.

According to further features in the described preferred embodiment, the mounting section has a sharp edge for insertion between the windshield and dashboard. Also, the plate member, mounting section, and elastic juncture section, are integrally formed as a single unit of transparent plastic. Further, the juncture section is formed with two U-shaped bends to increase its elasticity.

An accessory constructed in accordance with the foregoing features may be used for holding a sign or other article against the inner surface of the vehicle windshield and for conveniently removing the sign or article whenever desired. Such an accessory may also be manufactured in volume and at low cost.

According to a further feature in the embodiment of the invention described below, the accessory may further include a transparent jacket removably received over the plate member for retaining a sign between the jacket and the plate member.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
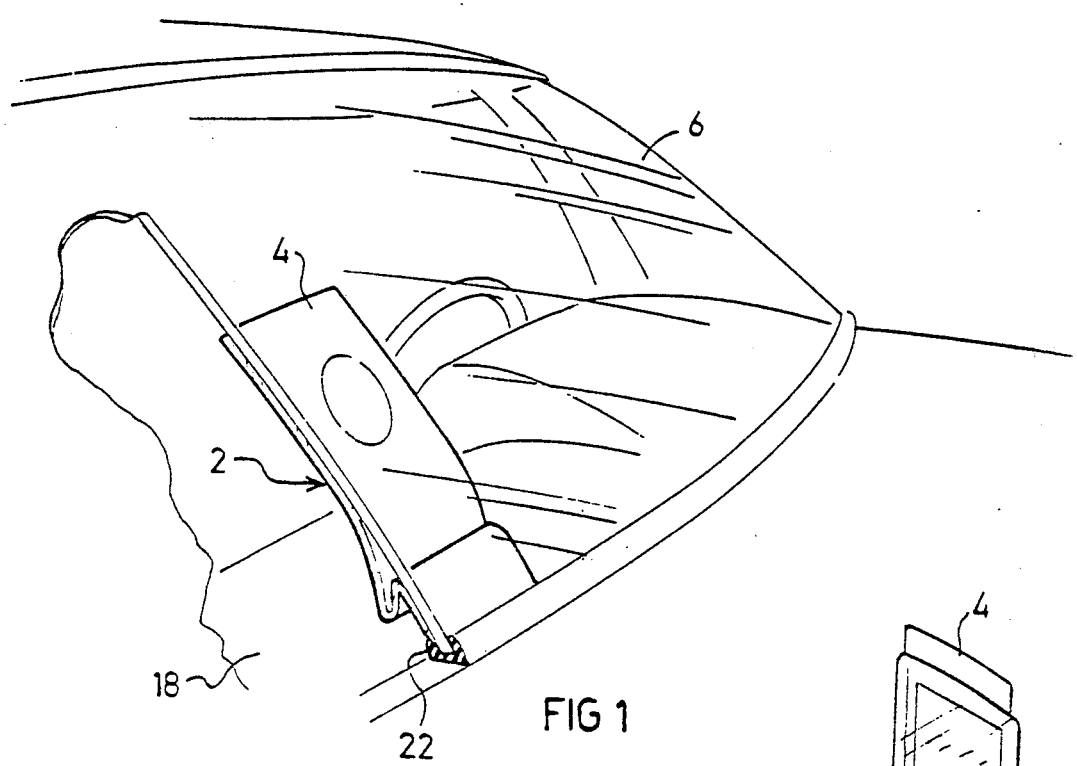
FIG. 1 is a fragmentary view illustrating a vehicle windshield equipped with one form of accessory constructed in accordance with the present invention.
Figure 2:
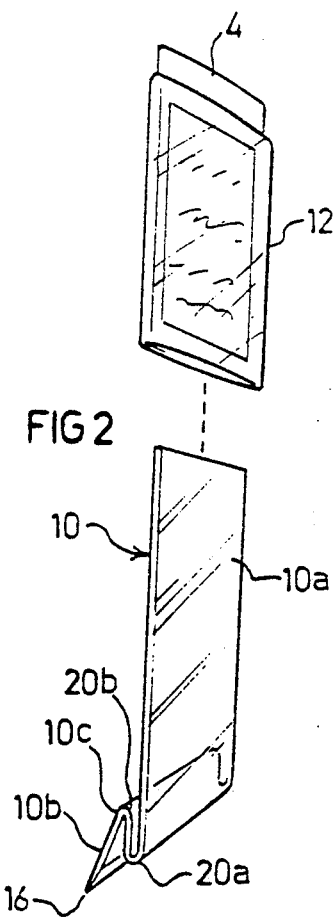
FIG. 2 is an exploded view illustrating the accessory of FIG. 1.

With reference first to FIG. 1, there is shown an accessory, generally designated 2, used for holding a sign 4 against the inner face of a motor vehicle windshield 6, so as to permit the sign to be viewed from externally of the vehicle. The sign 4 is held in a manner permitting it to be conveniently applied to or removed from the accessory 2 as and when The accessory 2 comprises a single integral unit, generally designated 10 in FIG. 2, and a jacket applied over unit 10 and adapted to receive the sign between the jacket and unit 10.

Figure 4:
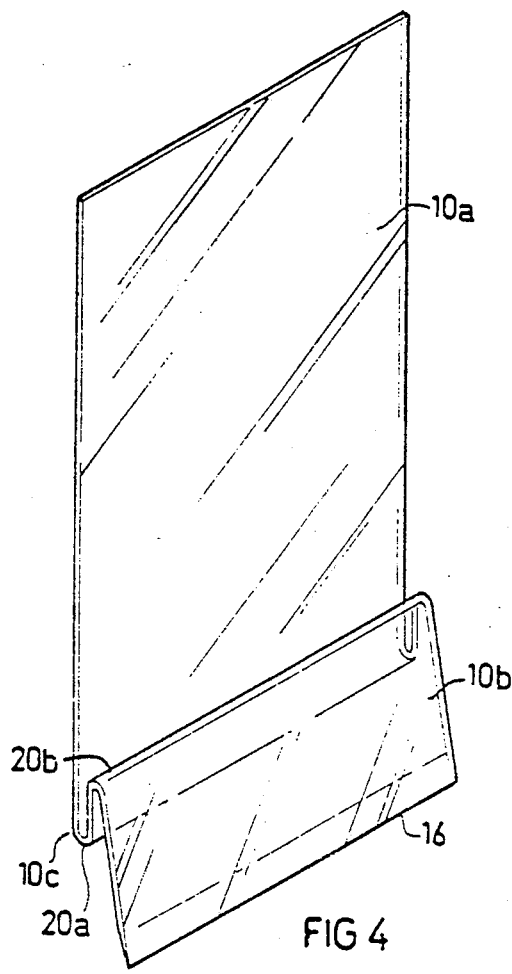
FIGS. 4, 5 and 6 are perspective, side and front views, respectively, of the accessory illustrated in FIGS. 1-3, but without the jacket shown in FIGS. 1 and 2.
Figure 6:
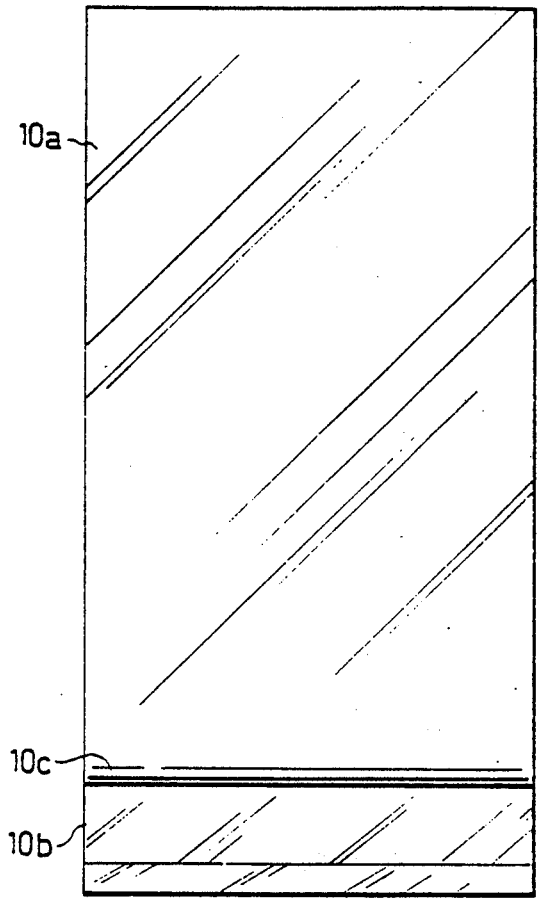
Figure 5:
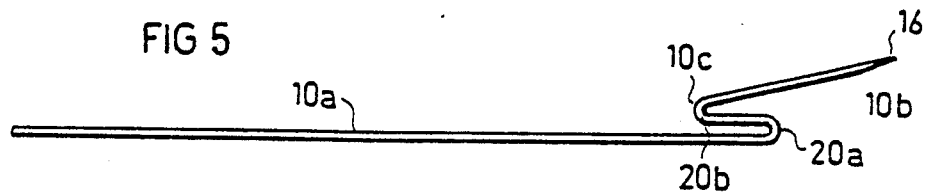

Unit 10 is more particularly illustrated in FIGS. 4-6. It comprises three sections, namely: a main plate member 10a; a mounting section 10b formed at one (the lower) end of plate member 10a; and an elastic juncture section 10c joining the plate member 10a to the mounting section 10b. The lower end of the mounting section 10b terminates in a sharp edge, shown at 16, to facilitate its insertion between the windshield 6 and the vehicle dashboard 18. Also, the mounting section 10b includes parallel opposed faces which extend obliquely to the dashboard member 10a. Further, the juncture section 10c joining the mounting section 10b to the plate member 10a is formed with two U-shaped bends, as shown at 20a, 20b, to increase its elasticity.

Preferably, the complete unit 10 is made as a single integral unit of transparent plastic material, such as an acrylic resin. The plate member 10a and mounting section 10b are both planar, with the mounting section 10b forming an oblique angle of 130°-175° with respect to the plane of the plate member 10a. Jacket 12 is preferably of a transparent flexible plastic.

In use, the mounting section 10b of the accessory is inserted, via its sharp edge 16, between the vehicle dashboard 18 and the windshield 6. Because of the oblique orientation of the mounting section 10b with respect to the plate member 10a, and the elasticity of the juncture section 10c, the plate member 10a is pressed against the inner surface of the windshield 6. Thus, the sign 4 received within jacket 12 carried by plate member 10a is pressed firmly against the windshield 6 so that it can be easily viewed from outside the vehicle. The elasticity of the juncture section 10c not only firmly holds the sign 4 in place for convenient viewing, but also prevents chattering of the accessory against the vehicle windshield.

FIG. 1 illustrates the mounting section 10b as being inserted into the space between the windshield 6 and its resilient seal 22, this insertion being facilitated by the sharp edge 16 at the lower end of the mounting section 10b.

In some modern vehicles, however, the windshield seal 22 is recessed below the vehicle dashboard 18, and there is a larger space between the dashboard and the windshield. In such vehicles, the unit may be inserted with its wider juncture section 10c in the space between the vehicle dashboard 18 and the windshield 6.

Figure 3:
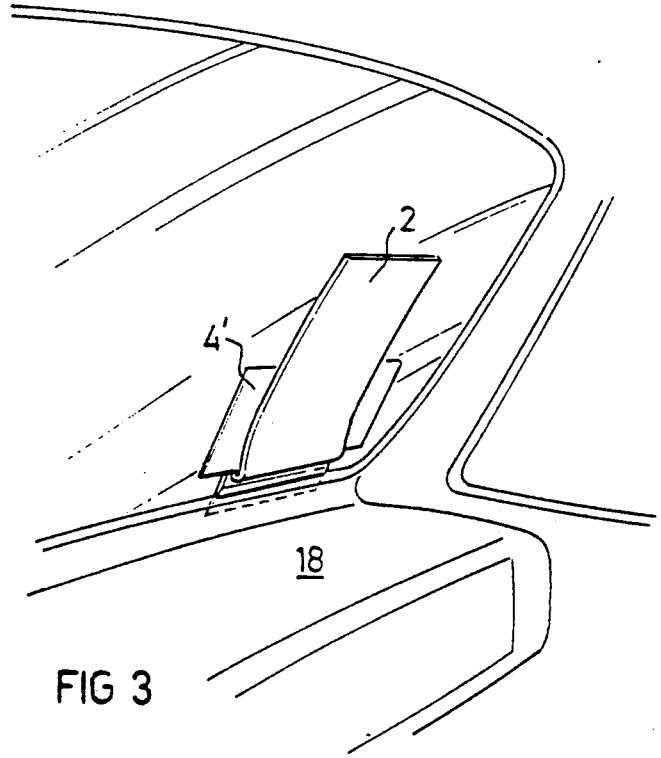
FIG. 3 illustrates an accessory similar to that of FIGS. 1 and 2, but omitting the jacket.

FIG. 3 illustrates a further variation, wherein the jacket 12 is omitted, and the sign, therein designated 4', is held between unit 2 and the vehicle windshield 6.

It will thus be seen that the accessory illustrated in the drawings may be used for holding a sign or other article against the windshield for easy viewing therethrough, and still permits the sign or other article to be conveniently removed or replaced whenever desired. It will also be seen that the described accessory can be produced in volume and at low cost.

While the invention has been described with respect to one preferred embodiment, it will be appreciated that many other variations, modifications and applications of the invention may be made.

What is claimed is:

1. A motor vehicle accessory particularly useful for holding a sign or other article, comprising: a plate member formed at one end with a mounting section for insertion between the vehicle windshield and the vehicle dashboard; said mounting section including parallel opposed faces extending at an oblique angle to said plate member, and being joined to it by an elastic juncture section, such that when the mounting section is inserted between the vehicle windshield and the vehicle dashboard, the plate member is pressed, by said oblique angle of the mounting section and the elasticity of said juncture section, towards the inner surface of the windshield to thereby contact and releasably press a sign or other article against the inner surface of the windshield.

2. The accessory according to claim 1, wherein said mounting section has a sharp edge for insertion between the windshield and the vehicle dashboard.

3. The accessory according to claim 1, wherein said plate member, mounting section, and elastic juncture section are integrally formed as a single unit.

4. The accessory according to claim 3, wherein said juncture section is formed with two U-shaped bends to increase its elasticity.

5. The accessory according to claim 3, wherein said plate member, mounting section, and elastic juncture section are all made of transparent plastic material.

6. The accessory according to claim 3, wherein said plate member and mounting section are of rectangular configuration.

7. The accessory according to claim 1, wherein said oblique angle is 130°–175°, and said plate member and mounting section are both planar, the plane of the mounting section forming said oblique angle with respect to the plane of the plate member.

8. The accessory according to claim 1, further including a transparent jacket removably received over said plate member for retaining a sign between the jacket and the plate member.

9. A motor vehicle accessory particularly useful for holding a sign or other article, comprising: a substantially planar plate member formed at one end with a substantially planar mounting section for insertion between the vehicle windshield and the vehicle dashboard; said mounting section being integrally formed with said plate member and being joined to it by an elastic juncture section formed with two U-shaped bends, such that when the mounting section is inserted between the vehicle windshield and the vehicle dashboard, the plate member is pressed towards the inner surface of the windshield to thereby releasably hold a sign or other article between it and the inner surface of the windshield.

10. The accessory according to claim 9, wherein said mounting section has a sharp edge for insertion between the windshield and the vehicle dashboard.

11. The accessory according to claim 10, wherein said plate member, mounting section, and elastic juncture section are all made of transparent plastic material.

12. The accessory according to claim 10, wherein said plate member and mounting section are of rectangular configuration.

13. The accessory according to claim 9, further including a transparent jacket removably received over said plate member for retaining a sign between the jacket and the plate member.

14. A motor vehicle accessory particularly useful for holding a sign or other article, comprising: a plate member integrally formed at one end with a mounting section for insertion between the vehicle windshield and the vehicle dashboard; a transparent jacket removably received over said plate member for retaining a sign between the jacket and the plate member; said mounting section extending obliquely to said plate member, and being joined to it by an elastic juncture section, such that when the mounting section is inserted between the vehicle windshield and the vehicle dashboard, the plate member is pressed towards the inner surface of the windshield to thereby releasably hold a sign or other article between it and the inner surface of the windshield.

15. The accessory according to claim 14, wherein said mounting section has a sharp edge for insertion between the windshield and the vehicle dashboard.

16. The accessory according to claim 14, wherein said juncture section is formed with two U-shaped bends to increase its elasticity.

17. The accessory according to claim 14, wherein said plate member, mounting section, and elastic juncture section are all made of transparent plastic material.

18. The accessory according to claim 14, wherein said plate member and mounting section are of rectangular configuration.

19. The accessory according to claim 14, wherein said plate member and mounting section are both planar, the plane of the mounting section forming an angle of 130°–175° with respect to the plane of the plate member.

* * * * *